United States Patent
Al-Qutub et al.

(10) Patent No.: US 7,891,166 B2
(45) Date of Patent: Feb. 22, 2011

(54) WATER ROCKET ENGINE WITH A TWO-PHASE NOZZLE

(75) Inventors: Amro Mohammad Al-Qutub, Dhahran (SA); Jad Taleb, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 909 days.

(21) Appl. No.: 11/819,516

(22) Filed: Jun. 27, 2007

(65) Prior Publication Data
US 2009/0000269 A1    Jan. 1, 2009

(51) Int. Cl.
   *B63H 11/00*    (2006.01)
(52) U.S. Cl. .............................. 60/221; 417/174; 446/52
(58) Field of Classification Search ................ 60/200.1, 60/221, 227, 780; 239/265.17; 417/174; 440/44, 45; 446/52
See application file for complete search history.

(56) References Cited

U.S. PATENT DOCUMENTS

| | | | | |
|---|---|---|---|---|
| 2,351,750 A | * | 6/1944 | Fawkes | 60/257 |
| 2,486,019 A | * | 10/1949 | Goddard | 417/173 |
| 2,528,354 A | * | 10/1950 | Flanagan | 60/221 |
| 3,252,281 A | * | 5/1966 | Everett et al. | 60/227 |
| 3,371,618 A | * | 3/1968 | Chambers | 417/196 |
| 3,402,555 A | * | 9/1968 | Piper | 60/227 |
| 3,650,214 A | | 3/1972 | Green | |
| 3,664,056 A | | 5/1972 | Stanzel | |
| 4,815,942 A | * | 3/1989 | Alperin et al. | 60/269 |
| 5,072,579 A | * | 12/1991 | Gongwer | 60/221 |
| 5,197,452 A | | 3/1993 | Johnson et al. | |
| 5,222,361 A | | 6/1993 | Nelson et al. | |
| 5,415,153 A | | 5/1995 | Johnson et al. | |
| 5,433,646 A | | 7/1995 | Tarng | |
| 5,839,940 A | | 11/1998 | Ensmenger | |
| 6,290,184 B1 | | 9/2001 | Paterro | |
| 6,347,623 B1 | | 2/2002 | Kownacki et al. | |
| 6,532,948 B2 | | 3/2003 | Grichen | |
| 6,957,526 B1 | * | 10/2005 | Lin | 60/221 |
| 2005/0077055 A1 | | 4/2005 | Celorio-Villasenor | |
| 2006/0225716 A1 | | 10/2006 | Lapointe | |

FOREIGN PATENT DOCUMENTS

| | | |
|---|---|---|
| CA | 2066118 | 8/1993 |
| JP | 2001-140746 | 5/2001 |

* cited by examiner

*Primary Examiner*—Ted Kim
(74) *Attorney, Agent, or Firm*—Richard C. Litman

(57) ABSTRACT

The water rocket engine with a two-phase nozzle includes a water rocket propulsion system having a reservoir, and a nozzle assembly disposed along a central longitudinal axis therein, the nozzle assembly comprising an inverted cup shaped fluid capture vessel having a substantially concave sidewall and extending away from an elongated tube. Open lower portion of the fluid capture vessel forms a fluid inlet. The elongated tube has a concave shaped side wall that forms a nozzle gas inlet at an upper portion of the tube, a nozzle outlet at a lower portion of the tube, and a passageway disposed between the tube upper portion and the tube lower portion. Within the confines of the capture vessel, fluid injection holes are disposed in the tube sidewall to provide fluid intake into the nozzle passageway where fluid and gas combine to form a two phase propellant.

4 Claims, 1 Drawing Sheet

WATER ROCKET ENGINE WITH A TWO-PHASE NOZZLE

BACKGROUND OF THE INVENTION

1. Field of the Invention

The present invention relates to a liquid-vapor gas motor and nozzle. More specifically, it is directed to a two phase reservoir and nozzle that, when sufficiently pressurized, can be used to propel a vehicle such as, e.g., a boat, plane, rocket, and the like, by a liquid/air propulsion combination.

2. Description of the Related Art

Over the years various types of water rockets have been developed which rely upon thrust developed from the expulsion of pressurized liquid and/or pressurized gases from a projectile in order to propel the vehicle. For example, in conventional water rockets the water acts as the propellant, while compressed gas is used as the energy source. Propulsion force is provided initially by the accelerated water through the nozzle, the water being driven by the high pressure of the gas acting on the top surface of the fluid. Once the fluid is exhausted, the gas exits the nozzle to thereby add few percent of the total impulse of the propulsion system.

More specifically, while the aforementioned water rocket propulsion system has been historically provided by variations of known designs and configurations, the variations generally consist of familiar, expected, and obvious structural configurations, notwithstanding the myriad of designs encompassed by the crowded prior art which has been developed for the fulfillment of countless objectives and requirements. Yet, there remains an unfulfilled need to continually improve water rocket performance by, e.g., increasing the specific impulse of the propulsion system.

Thus, a water rocket engine with a two-phase nozzle solving the aforementioned problem is desired.

SUMMARY OF THE INVENTION

The water rocket engine with a two-phase nozzle includes a water rocket propulsion system having a reservoir, and a nozzle assembly disposed along a central longitudinal axis therein, the nozzle assembly comprising an inverted cup shaped fluid capture vessel having a substantially concave sidewall and extending away from an elongated tube. Open lower portion of the fluid capture vessel forms a fluid inlet. The elongated tube has a concave shaped side wall that forms a nozzle gas inlet at an upper portion of the tube, a nozzle outlet at a lower portion of the tube, and a passageway disposed between the tube upper portion and the tube lower portion.

Within the confines of the capture vessel, fluid injection holes are disposed in the tube sidewall to provide fluid intake into the nozzle passageway where fluid and gas combine to form a two phase propellant. During operation of the propulsion system the combined propellants are expelled from the nozzle outlet. Gas pressure in the system provides the kinetic energy to force the gas phase to flow into the gas inlet and the fluid phase to flow into the fluid inlet and into the nozzle passageway via the injection holes.

The liquid-gas mixture expelled at the nozzle outlet has a specific impulse that is generally higher than that of related art systems because of the fluid and gas dynamics provided by the present invention. Fluid and gas are accelerated simultaneously through the nozzle. Gas is accelerated through the inlet of the nozzle. Water is drawn in the high speed gas stream through holes surrounding the side of the nozzle to form droplets of calculated sizes. The water is driven by the pressure difference between the high speed gas and the stagnant gas pressure acting on the water surface.

Size, distribution and location of the inlet water holes determine the water to gas mass flow ratio. The water droplets are accelerated via drag force generated by the speed difference relative to accelerated gas. Higher equivalent exhaust velocities are achieved to provide improved performance and range of the rocket.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
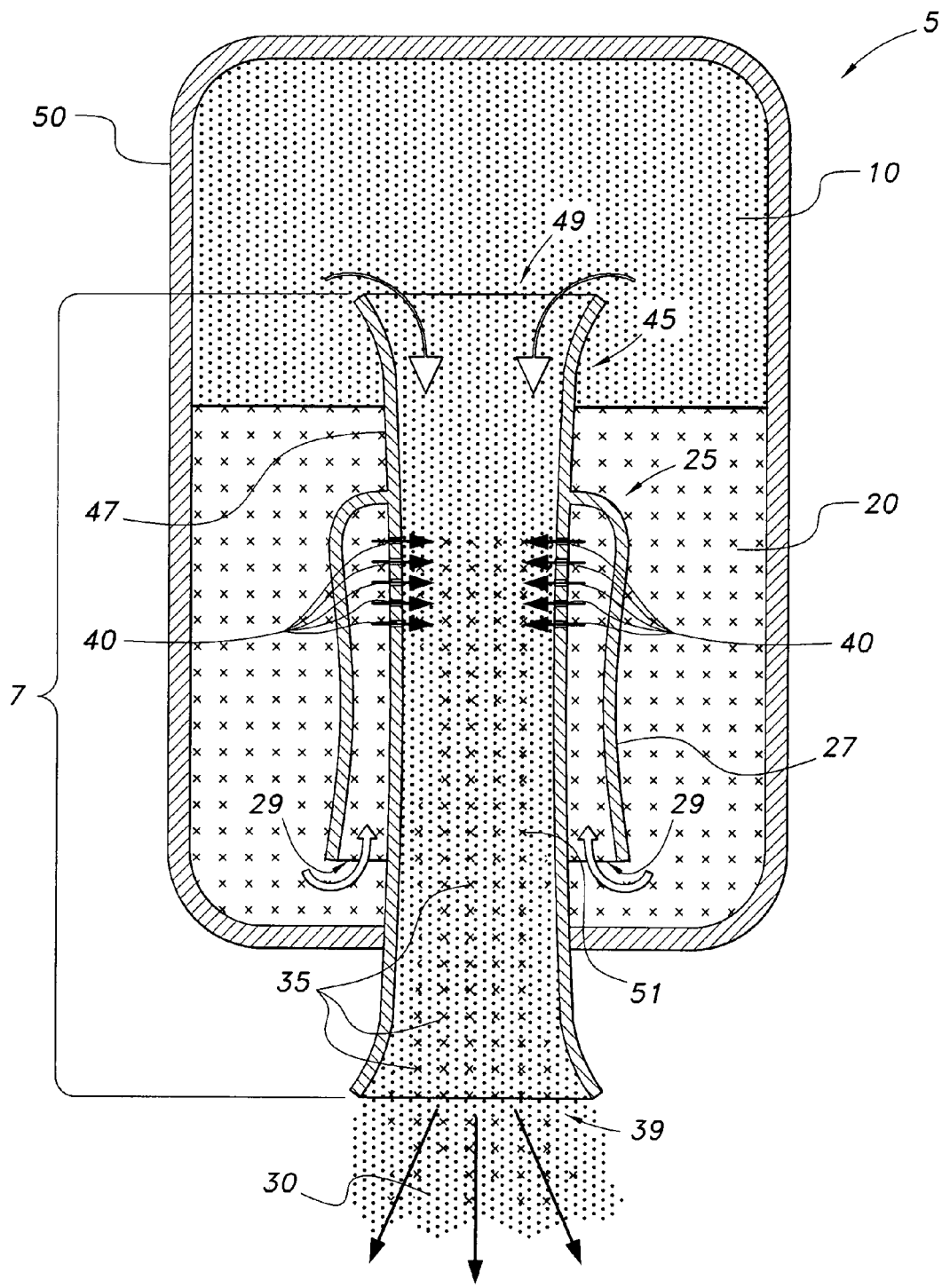
FIG. 1 is a section view of a water rocket engine with a two-phase nozzle, according to the present invention.

As shown in FIG. 1, the present invention is a water rocket propulsion system 5 having a reservoir 50, and a nozzle assembly 7 disposed along a central longitudinal axis therein, the nozzle assembly 7 comprising an inverted cup shaped fluid capture vessel 25 having a substantially concave sidewall 27 and concentrically extending from an elongated tube 45. Open lower portion of the fluid capture vessel forms a fluid inlet 29.

The elongated tube has a concave shaped side wall 47 that forms a nozzle gas inlet 49 at an upper portion of the tube, a nozzle outlet 39 at a lower portion of the tube, and a passageway 51 disposed between the tube upper portion and the tube lower portion. Within the confines of the capture vessel 25, fluid injection holes 40 are disposed in the tube sidewall 47 to provide fluid intake into the nozzle passageway 51 where fluid 20 and gas 10 combine to form a two phase propellant 30.

During operation of the propulsion system the combined propellants are expelled from the nozzle outlet 39. Gas pressure in the system provides the kinetic energy to force the gas phase to flow into the gas inlet 49 and the fluid phase to flow through the fluid inlet 29 and into the nozzle passageway 51 via the injection holes 40.

The liquid-gas mixture expelled at the nozzle outlet 39 has a specific impulse that is generally higher than that of related art systems because of the fluid and gas dynamics provided by the present invention. Fluid 20 and gas 10 are accelerated simultaneously through the nozzle passageway 51. Gas 10 is accelerated through the nozzle inlet 49. Fluid, e.g., water, is drawn in the high speed gas stream through the holes 40 in the side of the nozzle to form droplets 35 of calculated sizes. The fluid 20, e.g., water, is driven by the pressure difference between the high speed gas and the stagnant gas pressure acting on the fluid surface.

Size, distribution and location of the inlet fluid holes 40 determine the fluid to gas mass flow ratio. The fluid droplets are accelerated via drag force generated by the speed difference relative to accelerated gas. Higher equivalent exhaust velocities are achieved to provide improved performance and range of the rocket engine 5.

It is to be understood that the present invention is not limited to the embodiment described above, but encompasses any and all embodiments within the scope of the following claims.

We claim:

1. A water rocket engine with a two-phase nozzle, comprising:

a reservoir, and a nozzle assembly disposed along a central longitudinal axis therein, wherein the reservoir has an upper portion and a lower portion, the upper portion thereof being adapted for receiving a volume of pressurized air, the lower portion thereof being adapted for receiving a volume of liquid water;

the nozzle assembly comprising an inverted cup shaped fluid capture vessel concentrically extending from an elongated tube, the inverted cup shaped fluid capture vessel being positioned within the lower portion of the reservoir and being completely submerged within the volume of liquid water stored therein, the inverted cup shaped fluid capture vessel having an open lower end for receiving the water and a closed upper end, the closed upper end being secured to an outer surface of the elongated tube such that the elongated tube is positioned co-axially therewith;

the elongated tube having a sidewall that forms a nozzle gas inlet at an upper portion of the tube, a nozzle outlet at a lower portion of the tube, and a passageway disposed between the tube upper portion and the tube lower portion, wherein the nozzle gas inlet is positioned within the upper portion of the reservoir such that the pressurized air flows into the nozzle gas inlet, through the passageway and out of the nozzle outlet;

within the confines of the capture vessel, a plurality of fluid injection holes are disposed in the sidewall of the elongated tube, wherein the plurality of fluid injection holes are arrayed along the sidewall within a central region thereof which is covered and surrounded by the inverted cup shaped fluid capture vessel; and wherein the water captured in the inverted cup shaped capture vessel flows through the plurality of fluid injection holes to combine with the air flowing through the tube inlet to thereby form a combined fluid-gas propellant that accelerates through the passageway and is expelled from the nozzle outlet to provide increased thrust of the rocket engine.

2. The water rocket engine with a two-phase nozzle according to claim 1, wherein the capture vessel has a substantially concave sidewall.

3. The water rocket engine with a two-phase nozzle according to claim 1, wherein the elongated tube sidewall is concave.

4. The water rocket engine with a two-phase nozzle according to claim 1, wherein size, distribution and location of the fluid injection holes determines a fluid to gas mass flow ratio.

* * * * *